United States Patent
Schnoor et al.

(10) Patent No.: US 10,717,923 B2
(45) Date of Patent: Jul. 21, 2020

(54) COMPOSITIONS INCLUDING A VISCOSIFYING NON-IONIC ASSOCIATIVE POLYMER FOR TREATMENT OF SUBTERRANEAN FORMATIONS

(71) Applicant: Halliburton Energy Services, Inc., Houston, TX (US)

(72) Inventors: Eli Allen Schnoor, Kingwood, TX (US); Dipti Singh, Kingwood, TX (US); Ali Alwattari, The Woodlands, TX (US)

(73) Assignee: Halliburton Energy Services, Inc., Houston, TX (US)

(*) Notice: Subject to any disclaimer, the term of this patent is extended or adjusted under 35 U.S.C. 154(b) by 175 days.

(21) Appl. No.: 15/571,804

(22) PCT Filed: Jun. 5, 2015

(86) PCT No.: PCT/US2015/034481
§ 371 (c)(1),
(2) Date: Nov. 3, 2017

(87) PCT Pub. No.: WO2016/195713
PCT Pub. Date: Dec. 8, 2016

(65) Prior Publication Data
US 2018/0362836 A1 Dec. 20, 2018

(51) Int. Cl.
*C09K 8/68* (2006.01)
*C09K 8/66* (2006.01)
(Continued)

(52) U.S. Cl.
CPC ............ *C09K 8/68* (2013.01); *C09K 8/665* (2013.01); *C09K 8/80* (2013.01); *C09K 8/46* (2013.01);
(Continued)

(58) Field of Classification Search
None
See application file for complete search history.

(56) References Cited

U.S. PATENT DOCUMENTS 4,505,827 A * 3/1985 Rose .................. C08F 297/02
 252/1
7,351,681 B2 4/2008 Reddy et al.
(Continued)

FOREIGN PATENT DOCUMENTS

WO 2013040174 A1 3/2013

OTHER PUBLICATIONS

International Search Report and Written Opinion dated Mar. 7, 2016, for PCT Application No. PCT/US2015/034481 filed on Jun. 5, 2015. 13 pages.

*Primary Examiner* — John J Figueroa
(74) *Attorney, Agent, or Firm* — Chamberlain Hrdlicka

(57) ABSTRACT

Various embodiments relate to compositions including a viscosifying non-ionic associative polymer for treatment of subterranean formations. In various embodiments, the present invention provides a method of treating a subterranean formation. The method includes placing in the subterranean formation a composition including a viscosifying non-ionic associative polymer including at least one hydrophilic block and at least one hydrophobic group that is at each occurrence an independently selected substituted or unsubstituted ($C_5$-$C_{50}$)hydrocarbyl group.

17 Claims, 4 Drawing Sheets

The Effects of pH on Non-Ionic Associated Polymer (NAP)

(51) Int. Cl.
*C09K 8/80* (2006.01)
*C09K 8/46* (2006.01)

(52) U.S. Cl.
CPC ...... *C09K 2208/08* (2013.01); *C09K 2208/24* (2013.01); *C09K 2208/26* (2013.01); *C09K 2208/32* (2013.01)

(56) References Cited

U.S. PATENT DOCUMENTS

| | | |
|---|---|---|
| 7,687,438 B2 | 3/2010 | Munoz, Jr. et al. |
| 8,143,197 B2 | 3/2012 | Couillet et al. |
| 8,193,127 B2 | 6/2012 | Thieme et al. |
| 2004/0063587 A1 | 4/2004 | Horton et al. |
| 2005/0215438 A1 | 9/2005 | Prud'Homme et al. |
| 2009/0209438 A1 | 8/2009 | Thieme et al. |
| 2009/0247428 A1* | 10/2009 | Duncum ............... C09K 8/12 507/120 |
| 2011/0048718 A1 | 3/2011 | Zanten et al. |
| 2011/0146983 A1* | 6/2011 | Sawdon ............... C09K 8/36 166/276 |
| 2013/0025595 A1 | 1/2013 | Heesch et al. |
| 2014/0262293 A1 | 9/2014 | Song et al. |

\* cited by examiner

COMPOSITIONS INCLUDING A VISCOSIFYING NON-IONIC ASSOCIATIVE POLYMER FOR TREATMENT OF SUBTERRANEAN FORMATIONS

BACKGROUND

Viscous fluids are often used in hydraulic fracturing operations to suspend proppant and create wide fractures within the formation. The most common method for generating highly viscous fluids involves crosslinking hydrated polymers with metal or borate ions, resulting in a crosslinked polymeric network. However, in addition to requiring multiple additives, these networks can be permanently damaged by high shear rates, reducing their ability to transport proppant. Contrary to the use of highly viscous fluids, hydraulic fracturing operations commonly referred to as "water fracs" use ungelled water and rely on the use of high pumping rates to fracture rock and place proppant. This method is beneficial for certain formations. However, due to the low viscosity of water frac fluids, the size and concentration of proppant used in these operations are more limited than in crosslinked fracturing operations, potentially lowering the conductivity of the fractures and negatively affecting production rates.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
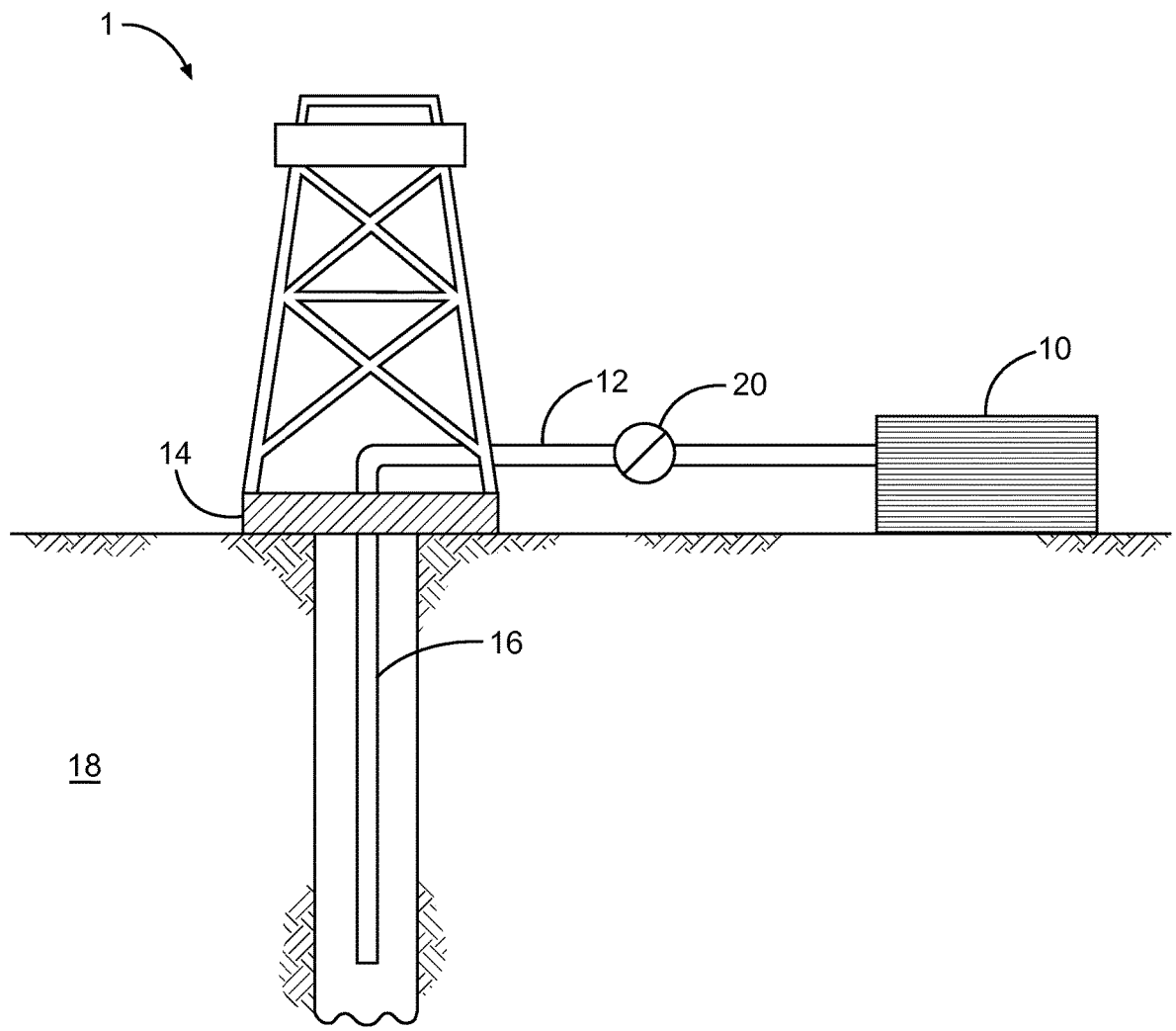
FIG. 1 illustrates a system or apparatus for delivering a composition to a subterranean formation, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

In this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000,1" is equivalent to "0.0001."

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "organic group" as used herein refers to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can itself be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "heterocyclyl" as used herein refers to aromatic and non-aromatic ring compounds containing three or more ring members, of which one or more is a heteroatom such as, but not limited to, N, O, and S. The term "heteroarylalkyl" as used herein refers to alkyl groups as defined herein in which a hydrogen or carbon bond of an alkyl group is replaced with a bond to a heteroaryl group as defined herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include about 1 to about 12, about 1 to about 20, or about 1 to about 40 carbon atoms bonded to the oxygen atom, and can further include double or triple bonds, and can also include heteroatoms. For example, an allyloxy group or a methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" or "hydrocarbyl" as used herein refers to a molecule or functional group, respectively, that includes carbon and hydrogen atoms. The term can also refer to a molecule or functional group that normally includes both carbon and hydrogen atoms but wherein all the hydrogen atoms are substituted with other functional groups. A hydrocarbyl group can be a functional group derived from a straight chain, branched, or cyclic hydrocarbon, and can be alkyl, alkenyl, alkynyl, aryl, cycloalkyl, acyl, or any combination thereof. Hydrocarbyl groups can be shown as $(C_a-C_b)$hydrocarbyl, wherein a and b are positive integers and mean having any of a to b number of carbon atoms. For example, $(C_1-C_4)$hydrocarbyl means the hydrocarbyl group can be methyl ($C_1$), ethyl ($C_2$), propyl ($C_3$), or butyl ($C_4$), and $(C_0-C_b)$hydrocarbyl means in certain embodiments there is no hydrocarbyl group.

The term "solvent" as used herein refers to a liquid that can dissolve a solid, liquid, or gas. Non-limiting examples of solvents are silicones, organic compounds, water, alcohols, ionic liquids, and supercritical fluids.

The term "number-average molecular weight" (MO as used herein refers to the ordinary arithmetic mean of the molecular weight of individual molecules in a sample. It is defined as the total weight of all molecules in a sample divided by the total number of molecules in the sample. Experimentally, $M_n$ is determined by analyzing a sample divided into molecular weight fractions of species i having $n_i$ molecules of molecular weight $M_i$ through the formula $M_n = \Sigma M_i n_i / \Sigma n_i$. The $M_n$ can be measured by a variety of well-known methods including gel permeation chromatography, spectroscopic end group analysis, and osmometry. If unspecified, molecular weights of polymers given herein are number-average molecular weights.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" or "fracturing fluid composition" refers to fluids or slurries used downhole during fracturing operations.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including stimulation, hydraulic fracturing, clean-up, remedial treatment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product or fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In various embodiments, salts having a positively charged counterion can include any suitable positively charged counterion. For example, the counterion can be ammonium ($NH_4^+$), or an alkali metal such as sodium ($Na^+$), potassium ($K^+$), or lithium ($Li^+$). In some embodiments, the counterion can have a positive charge greater than +1, which can in some embodiments complex to multiple ionized groups, such as $Zn^{2+}$, $Al^{3+}$, or alkaline earth metals such as $Ca^{2+}$ or $Mg^{2+}$.

In various embodiments, salts having a negatively charged counterion can include any suitable negatively charged counterion. For example, the counterion can be a halide, such as fluoride, chloride, iodide, or bromide. In other examples, the counterion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion can be a conjugate base of any carboxylic acid, such as acetate or formate. In some embodiments, a counterion can have a negative charge greater than −1, which can in some embodiments complex to multiple ionized groups, such as oxide, sulfide, nitride, arsenate, phosphate, arsenite, hydrogen phosphate, sulfate, thio sulfate, sulfite, carbonate, chromate, dichromate, peroxide, or oxalate.

In various embodiments, the present invention provides a method of treating a subterranean formation. The method includes placing in the subterranean formation a composition including a viscosifying non-ionic associative polymer. The viscosifying non-ionic associative polymer includes at least one hydrophilic block and at least one hydrophobic group that is at each occurrence an independently selected substituted or unsubstituted ($C_5$-$C_{50}$)hydrocarbyl group.

In various embodiments, the present invention provides a method of treating a subterranean formation. The method includes placing in the subterranean formation a fracturing fluid composition including a viscosifying non-ionic associative polymer having the structure:

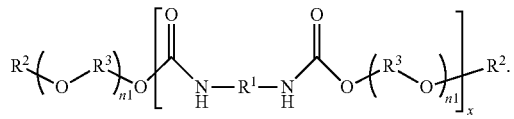

At each occurrence, $R^1$ is independently substituted or unsubstituted ($C_1$-$C_{30}$)hydrocarbylene interrupted by 0, 1, 2, or 3 groups selected from the group consisting of —O—, —S—, substituted or unsubstituted —NH—, —($CH_2$—$CH_2$—$CH_2$—O)$_{n2}$—, and —($CH_2$—$CH_2$—O)$_{n2}$— wherein at each occurrence n2 is independently about 1 to about 1,000. At each occurrence, $R^2$ is an independently selected substituted or unsubstituted ($C_5$-$C_{50}$)hydrocarbyl group. At each occurrence, $R^3$ is independently selected from propylene and ethylene. At each occurrence, $n^1$ is independently about 2 to about 10,000. The variable x is about 1 to about 1,000,000. The viscosifying non-ionic associative polymer is about 0.1 wt % to about 40 wt % of the fracturing fluid composition. The method also includes fracturing the subterranean formation with the fracturing fluid composition.

In various embodiments, the present invention provides a system including a tubular disposed in a subterranean formation. The system also includes a pump configured to pump a composition including a viscosifying non-ionic associative polymer in the subterranean formation through the tubular. The viscosifying non-ionic associative polymer includes at least one hydrophilic block and at least one hydrophobic group that is at each occurrence an independently selected substituted or unsubstituted ($C_5$-$C_{50}$)hydrocarbyl group.

In various embodiments, the present invention provides a composition for treatment of a subterranean formation. The composition includes a viscosifying non-ionic associative polymer including at least one hydrophilic block and at least one hydrophobic group that is at each occurrence an independently selected substituted or unsubstituted ($C_5$-$C_{50}$) hydrocarbyl group.

In various embodiments, the present invention provides a fracturing fluid for treatment of a subterranean formation. The fracturing fluid includes a viscosifying non-ionic associative polymer having the structure:

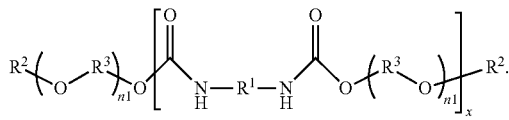

At each occurrence, $R^1$ is independently substituted or unsubstituted ($C_1$-$C_{30}$)hydrocarbylene interrupted by 0, 1, 2, or 3 groups selected from the group consisting of —O—, —S—, substituted or unsubstituted —NH—, —($CH_2$—$CH_2$—$CH_2$—O$)_{n2}$—, and —($CH_2$—$CH_2$—O$)_{n2}$— wherein at each occurrence n2 is independently about 1 to about 1,000. At each occurrence, $R^2$ is an independently selected substituted or unsubstituted ($C_5$-$C_{50}$)hydrocarbyl group. At each occurrence, $R^3$ is independently selected from propylene and ethylene. At each occurrence, $n^1$ is independently about 2 to about 10,000. The variable x is about 1 to about 1,000,000. The viscosifying non-ionic associative polymer is about 0.1 wt % to about 40 wt % of the fracturing fluid composition.

In various embodiments, the present invention provides a method of preparing a composition for treatment of a subterranean formation. The method includes forming the composition, the composition including a viscosifying non-ionic associative polymer including at least one hydrophilic block and at least one hydrophobic group that is at each occurrence an independently selected substituted or unsubstituted ($C_5$-$C_{50}$)hydrocarbyl group.

In various embodiments, subterranean use of the viscosifying non-ionic associative polymer of the present invention provides certain advantages over the use of other viscosifying polymers, at least some of which are unexpected. In various embodiments, the viscosifying non-ionic associative polymer can provide viscosification on its own without the addition of any additives. In various embodiments, the viscosifying non-ionic associative polymer can provide viscosification without the use of crosslinkers or crosslinking. In various embodiments, the viscosifying non-ionic associative polymer can provide viscosification without the use of surfactants or with a lesser amount of surfactants, as compared to other viscosifiers. In various embodiments, the viscosifying non-ionic associative polymer can provide viscosification under shear with no shear thinning or with decreased shear thinning, as compared to other viscosifiers. In various embodiments, the viscosifying non-ionic associative polymer can be placed under shear with no degradation or with less degradation (e.g., due to restorable associations between hydrophobic portions and between hydrophilic portions of the polymer), as compared to other viscosifiers. In various embodiments, the viscosifying non-ionic associative polymer can provide a more constant viscosity over a wider range of shear rates than other viscosifiers. In various embodiments, the higher viscosity of the composition under shear can provide greater proppant carrying capacity than other viscosified solutions.

In various embodiments, the viscosifying non-ionic associative polymer can provide effective viscosification in non-ideal aqueous solutions, such as in non-deionized water solutions that can have any range of concentration therein of salts, biological contaminants (e.g., high microorganism content, such as high bacterial content), pollutants, organic solvents, oils, tars, suspended solids (e.g., any total suspended solids level (TSS)), or dissolved solids (e.g., any total dissolved solids level (TDS)), and that can have any temperature, pH, or level of inhomogeneity. In various embodiments, the viscosifying non-ionic associative polymer can have no sensitivity to water quality or less sensitivity to water quality, such as no sensitivity to salts or less sensitivity to salts, as compared to other viscosifiers. For example, in various embodiments, the viscosifying non-ionic associative polymer can provide effective viscosification in water having high total dissolved solids (TDS) levels. In various embodiments, the viscosifying non-ionic associative polymer can have no sensitivity to pH or less sensitivity to pH, as compared to other viscosifiers. In various embodiments, the viscosifying non-ionic associative polymer can have no sensitivity to temperature or less sensitivity to temperature, as compared to other viscosifiers.

In various embodiments, the viscosifying non-ionic associative polymer can be less expensive than other viscosifiers. In some embodiments, the viscosifying non-ionic associative polymer can provide a given viscosity increase for a lower cost than other viscosifiers. In various embodiments, the viscosifying non-ionic associative polymer can allow water frac-like operations to be carried out with larger proppant or that carry proppant deeper into fractures.

Method of Treating a Subterranean Formation.

In some embodiments, the present invention provides a method of treating a subterranean formation. The method includes placing in the subterranean formation a composition including viscosifying non-ionic associative polymer including at least one hydrophilic block and at least one hydrophobic group. The placing of the composition in the subterranean formation can include contacting the composition and any suitable part of the subterranean formation, or contacting the composition and a subterranean material, such as any suitable subterranean material. The subterranean formation can be any suitable subterranean formation. In some examples, the placing of the composition in the subterranean formation includes contacting the composition with or placing the composition in at least one of a fracture, at least a part of an area surrounding a fracture, a flow pathway, an area surrounding a flow pathway, and an area desired to be fractured. The placing of the composition in the subterranean formation can be any suitable placing and can include any suitable contacting between the subterranean formation and the composition. The placing of the composition in the subterranean formation can include at least partially depositing the composition in a fracture, flow pathway, or area surrounding the same.

The method can include hydraulic fracturing, such as a method of hydraulic fracturing to generate a fracture or flow pathway. The placing of the composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally midto low-strength acid), a pad stage (e.g., during injection of fluid only with no proppant, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the composition is placed in or contacted to, or the composition is placed in or contacted to an area surrounding the generated fracture or flow pathway.

In some embodiments, the method can be a method of enhanced oil recovery. The method can include water flooding, wherein the composition is a water flooding-fluid. The method can include sweeping or displacing oil in the subterranean formation toward a well with the composition. For example, the method can include placing the composition in a subterranean formation downhole via an injection wellbore. In some examples, the placing of the composition in the subterranean formation includes contacting the composition with or placing the composition in at least one of a production zone (e.g., a pay zone), a flow pathway, and an area surrounding a flow pathway. The method can include extracting material including petroleum from the subterranean formation downhole via the production wellbore.

In some embodiments, the method can be a method of flooding, stimulation, fracturing, remedial treatment, or a combination thereof.

In some embodiments, the method includes obtaining or providing the composition including the viscosifying non-ionic associative polymer. The obtaining or providing of the composition can occur at any suitable time and at any suitable location. The obtaining or providing of the composition can occur above the surface (e.g., the viscosifying non-ionic associative polymer can be mixed with other components to form the composition above-surface). The obtaining or providing of the composition can occur in the subterranean formation (e.g., the viscosifying non-ionic associative polymer can be mixed with other components to form the composition downhole).

The composition can be an aqueous solution including the viscosifying non-ionic associative polymer. The composition can include any suitable proportion of aqueous liquid, such that the composition can be used as described herein. For example, about 0.000.1 wt % to 99.999.9 wt % of the composition can be the aqueous liquid, or about 0.01 wt % to about 99.99 wt %, about 0.1 wt % to about 99.9 wt %, or about 20 wt % to about 90 wt %, or about 0.000.1 wt % or less, or about 0.000,001 wt %, 0.000,1, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999 wt %, or about 99.999.9 wt % or more of the composition can be the aqueous liquid. The aqueous liquid can be a salt water. The salt can be any suitable salt, such as at least one of NaBr, $CaCl_2$, $CaBr_2$, $ZnBr_2$, KCl, NaCl, a magnesium salt, a bromide salt, a formate salt, an acetate salt, and a nitrate salt. The viscosifying non-ionic associative polymer can effectively provide increased viscosity in aqueous solutions having various total dissolved solids levels, or having various ppm salt concentration. The viscosifying non-ionic associative polymer can provide effective increased viscosity of a salt water having any suitable total dissolved solids level, such as about 1,000 mg/L to about 250,000 mg/L, or about 1,000 mg/L or less, or about 5,000 mg/L, 10,000, 15,000, 20,000, 25,000, 30,000, 40,000, 50,000, 75,000, 100,000, 125,000, 150,000, 175,000, 200,000, 225,000, or about 250,000 mg/L or more. The viscosifying non-ionic associative polymer can provide effective increased viscosity of a salt water having any suitable salt concentration, such as about 1,000 ppm to about 300,000 ppm, or about 1,000 ppm to about 150,000 ppm, or about 1,000 ppm or less, or about 5,000 ppm, 10,000, 15,000, 20,000, 25,000, 30,000, 40,000, 50,000, 75,000, 100,000, 125,000, 150,000, 175,000, 200, 000, 225,000, 250,000, 275,000, or about 300,000 ppm or more. In some examples, the aqueous liquid can have a concentration of at least one of NaBr, $CaCl_2$, $CaBr_2$, $ZnBr_2$, KCl, and NaCl of about 0.1% w/v to about 20% w/v, or about 0.1% w/v or less, or about 0.5% w/v, 1, 2, 3, 4, 5, 6, 7, 8, 9, 10, 11, 12, 13, 14, 15, 16, 17, 18, 19, 20, 21, 22, 23, 24, 25, 26, 27, 28, 29, or about 30% w/v or more.

The composition can have any suitable viscosity above surface or downhole, such that the composition can be used as described herein. In various embodiments, the viscosifying non-ionic associative polymer can provide a more constant viscosity over a wider range of shear rates than other viscosifiers. The viscosity can be affected by any suitable component, such as one or more viscosifying non-ionic associative polymers, one or more surfactants, one or more secondary viscosifiers, one or more crosslinked products of a secondary viscosifier and a crosslinker, or any combination thereof. In some embodiments, the viscosity of the composition, at standard temperature and pressure and at a shear rate of about 200 $s^{-1}$ to about 1,000 $s^{-1}$, 400 $s^{-1}$ to about 1,000 $s^{-1}$, or 600 $s^{-1}$ to about 1,000 $s^{-1}$, is about 10 cP to about 10,000 cP, or about 50 cP to about 1,000 cP, or about 10 cP or less, or about 15 cP, 20, 25, 50, 75, 100, 150, 200, 250, 500, 750, 1,000, 1,250, 1,500, 2,000, 2,500, 5,000 cP, or about 10,000 cP or more. In some embodiments, the viscosity of the composition, at standard temperature and pressure and at a shear rate of about 0 $s^{-1}$ to about 1 $s^{-1}$, is about 10 cP to about 10,000 cP, or about 50 cP to about 1,000 cP, or about 10 cP or less, or about 15 cP, 20, 25, 50, 75, 100, 150, 200, 250, 500, 750, 1,000, 1,250, 1,500, 2,000, 2,500, 5,000 cP, or about 10,000 cP or more.

Viscosifying Non-Ionic Associative Polymer.

Associative polymers include portions that can associate together inter- or intra-molecularly in solution due to similar polarities, modifying the viscosity of the solution. The composition includes a viscosifying non-ionic associative polymer including at least one hydrophilic block and at least one hydrophobic group. The hydrophilic blocks can inter- or intra-molecularly associate in solution (e.g., in aqueous solution) to provide an increase in viscosity. Likewise, the hydrophobic blocks can inter- or intra-molecularly associate in solution (e.g., in aqueous solution) to provide an increase in viscosity. The composition can include one viscosifying non-ionic associative polymer, or more than one viscosifying non-ionic associative polymer. The one or more viscosifying non-ionic associative polymers can be any suitable proportion of the composition, such that the composition can be used as described herein. For example, about 0.001 wt % to about 100 wt % of the composition can be the viscosifying non-ionic associative polymer, about 0.1 wt % to about 40 wt %, about 1 wt % to about 20 wt %, about 2 wt % to about 10 wt %, about 2 wt % to about 7 wt %, or about 0.001 wt % or less, or about 0.01 wt %, 0.1, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 22, 24, 26, 28, 30, 35, 40, 45, 50, 55, 60, 65, 70, 75, 80, 85, 90, 91, 92, 93, 94, 95, 96, 97, 98, 99, 99.9 wt %, or about 99.99 wt % or more.

The viscosifying non-ionic associative polymer can be effective to provide viscosification of the composition in the absence of surfactants. In some embodiments, the composition includes one or more surfactants. In some embodiments, the composition is free of surfactants.

The at least one hydrophobic group can be at each occurrence an independently selected substituted or unsubstituted $(C_5-C_{50})$hydrocarbyl group. At each occurrence the hydrophobic group can be an independently selected $(C_8-C_{30})$hydrocarbyl group. The viscosifying non-ionic associative polymer can include at least two of the hydrophobic groups. The hydrophobic group can be a terminal hydrophobic group. The viscosifying non-ionic associative polymer can be a linear polymer having two of the hydrophobic groups, wherein the hydrophobic groups are terminal hydrophobic groups. The viscosifying non-ionic polymer can be a non-linear polymer, and can have more than two hydrophobic groups. In some embodiments, the viscosifying non-ionic associative polymer can be at least one of a graft polymer and a star polymer. The viscosifying non-ionic associative polymer can be a triblock linear polymer with terminal hydrophobic groups at each terminus.

At each occurrence the hydrophilic block can have a structure selected from the group consisting of $-(CH_2-CH_2-CH_2-O)_{n1}-$ and $-(CH_2-CH_2-O)_{n1}-$, wherein at each occurrence n1 is independently about 1 to about 10,000 (e.g., 1 to about 1,000, 1 to about 100, or about 1, 2, 3, 4, 5, 6, 7, 8, 9, 10, 12, 14, 16, 18, 20, 25, 50, 75, 100, 150, 200, 250, 500, 1,000, 1,500, 2,000, 5,000, or about 10,000 or more). The viscosifying non-ionic associative polymer can include an amine-containing linking group between each hydrophilic block.

The viscosifying non-ionic associative polymer can have the structure:

The variable EG is the hydrophobic group (e.g., a terminal hydrophobic group). The variable HPB is the hydrophilic block. The variable LG is the amine-containing linking group. The variable x can be about 1 to about 1,000,000, about 2 to about 1,000,000, about 2 to about 500,000, or about 1, 2, 3, 4, 5, 6, 7, 8, 9, 10, 12, 14, 16, 18, 20, 25, 30, 35, 40, 45, 50, 60, 70, 80, 90, 100, 120, 140, 160, 180, 200, 250, 500, 750, 1,000, 2,500, 5,000, 10,000, 20,000, 50,000, 100,000, 500,000, or 1,000,000 or more.

The amine-containing linking group can be derived from at least one of a diisocyanate, melamine, urea, thiourea, cyanamide, and a diamine (e.g., derived via reaction with any one of the same). In some embodiments, the amine-containing linking group is a diurethane having the structure:

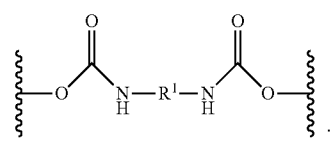

At each occurrence, $R^1$ can independently be a substituted or unsubstituted $(C_1-C_{30})$hydrocarbylene interrupted by 0, 1, 2, or 3 groups selected from the group consisting of $-O-$, $-S-$, substituted or unsubstituted $-NH-$, $-(CH_2-CH_2-CH_2-O)_{n2}-$, and $-(CH_2-CH_2-O)_{n2}-$ wherein at each occurrence n2 is independently about 1 to about 1,000 (e.g., 1 to about 100, 1 to about 500, or about 1, 2, 3, 4, 5, 6, 7, 8, 9, 10, 12, 14, 16, 18, 20, 25, 50, 75, 100, 150, 200, 250, 500, 750, or about 1,000 or more).

The viscosifying non-ionic associative polymer can have the structure:

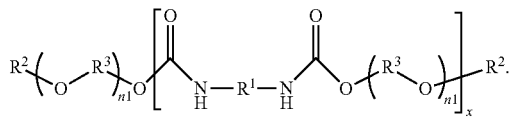

At each occurrence, $R^1$ can independently be a substituted or unsubstituted $(C_1-C_{30})$hydrocarbylene interrupted by 0, 1, 2, or 3 groups selected from the group consisting of $-O-$, $-S-$, substituted or unsubstituted $-NH-$, $-(CH_2-CH_2-CH_2-O)_{n2}-$, and $-(CH_2-CH_2-O)_{n2}-$ wherein at each occurrence n2 is independently about 1 to about 1,000. At each occurrence, $R^2$ can be an independently selected substituted or unsubstituted $(C_5-C_{50})$hydrocarbyl group. At each occurrence, $R^3$ can be independently selected from propylene and ethylene. At each occurrence, $n^1$ can be independently about 1 to about 10,000. The variable x can be about 1 to about 1,000,000.

At each occurrence, $R^1$ can independently be a substituted or unsubstituted $(C_1-C_{30})$hydrocarbylene interrupted by 0, 1, 2, or 3 groups selected from the group consisting of $-O-$, $-S-$, substituted or unsubstituted $-NH-$, $-(CH_2-CH_2-CH_2-O)_{n2}-$, and $-(CH_2-CH_2-O)_{n2}-$ wherein at each occurrence n2 is independently about 1 to about 1,000 (e.g., 1 to about 100, 1 to about 500, or about 1, 2, 3, 4, 5, 6, 7, 8, 9, 10, 12, 14, 16, 18, 20, 25, 50, 75, 100, 150, 200, 250, 500, 750, or about 1,000 or more). At each occurrence, $R^1$ can independently be a $(C_1-C_{30})$hydrocarbylene. At each occurrence, $R^1$ can have a structure selected from the group consisting of:

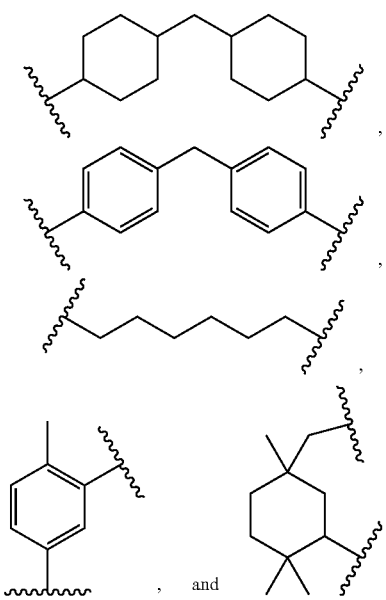

The variable $R^1$ can have the structure:

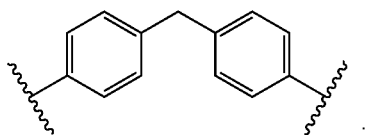 [SMILES: *c1ccc(Cc2ccc(*)cc2)cc1]

At each occurrence, $R^2$ can be an independently selected substituted or unsubstituted $(C_5$-$C_{50})$hydrocarbyl group. At each occurrence, $R^2$ can be an independently selected $(C_8$-$C_{30})$hydrocarbyl group. At each occurrence, $R^2$ can be an independently selected $(C_8$-$C_{20})$hydrocarbyl group, such as a $(C_8)$alkyl (e.g., branched or linear), $(C_9)$, $(C_{10})$, $(C_{11})$alkyl, $(C_{12})$, $(C_{13})$, $(C_{14})$, $(C_{15})$, $(C_{16})$, $(C_{17})$, $(C_{18})$, $(C_{19})$, or $(C_{20})$alkyl.

At each occurrence, $R^3$ can be independently selected from propylene and ethylene. The variable $R^3$ can be ethylene.

At each occurrence, $n^1$ can be independently about 1 to about 10,000, about 2 to about 1,000, about 50 to about 200, or about 1, 2, 3, 4, 5, 6, 7, 8, 9, 10, 12, 14, 16, 18, 20, 25, 30, 35, 40, 50, 60, 70, 80, 90, 100, 110, 120, 130, 140, 150, 160, 170, 180, 190, 200, 220, 240, 260, 280, 300, 350, 400, 450, 500, 600, 700, 800, 900, 1,000, 1,500, 2,000, 2,500, 5,000, 7,500, or about 10,000 or more.

The variable x can be about 1 to about 1,000,000, about 2 to about 1,000,000, about 2 to about 500,000, or about 1, 2, 3, 4, 5, 6, 7, 8, 9, 10, 12, 14, 16, 18, 20, 25, 30, 35, 40, 45, 50, 60, 70, 80, 90, 100, 120, 140, 160, 180, 200, 250, 500, 750, 1,000, 2,500, 5,000, 10,000, 20,000, 50,000, 100,000, 500,000, or 1,000,000 or more.

In some embodiments, the viscosifying non-ionic associative polymer has the structure:

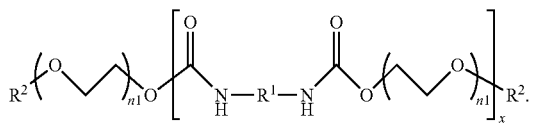

In some embodiments, the viscosifying non-ionic associative polymer has the structure:

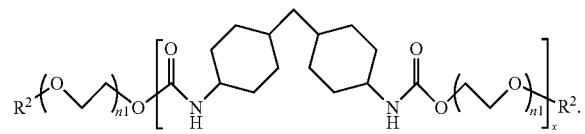

The viscosifying non-ionic associative polymer can have any suitable molecular weight consistent with the structures described herein. In some embodiments, the molecular weight of the polymer can be about 500 to about 10,000,000, about 1,000 to about 100,000, or about 500 or less, or about 1,000, 1,500, 2,000, 2,500, 5,000, 7,500, 10,000, 15,000, 20,000, 25,000, 50,000, 75,000, 100,000, 150,000, 200,000, 250,000, 500,000, 750,000, 1,000,000, 5,000,000, or about 10,000,000 or more.

Examples of suitable viscosifying non-ionic associative polymers can include those sold under the Rheolate® name, such as Rheolate 205® containing a urea functional group or Rheolate® 208, 204, 212, 244, 255, or 278. One example is Rheolate® FX 1100, a polycondensate of polyethylene glycol containing 136 parts by mole of ethylene oxide, stearyl alcohol polyoxyethylenated with 100 parts by mole of ethylene oxide, and hexamethylene diisocyanate (HDI) with a weight-average molecular weight of 30,000. Other examples can include viscosifying non-ionic associative polymers sold under the Acrysol™ name, such as Acrysol™ RM 184. Other examples can include viscosifying non-ionic associative polymers sold under the Elfacos® name, such as Elfacos® T212 containing a $(C_{18})$alkyl chain. Other suitable viscosifying non-ionic associative polymers can include those sold under the Aculyn® name, such as Aculyn® 44 and Aculyn® 46.

Other Components.

The composition including the viscosifying non-ionic associative polymer, or a mixture including the composition, can include any suitable additional component in any suitable proportion, such that the viscosifying non-ionic associative polymer, composition, or mixture including the same, can be used as described herein. Any component listed in this section can be present or not present in the composition or a mixture including the same.

In some embodiments, the composition or a mixture including the same includes one or more secondary viscosifiers. The secondary viscosifier can be any suitable viscosifier. The secondary viscosifier can affect the viscosity of the composition or a solvent that contacts the composition at any suitable time and location. In some embodiments, the secondary viscosifier provides an increased viscosity at least one of before injection into the subterranean formation, at the time of injection into the subterranean formation, during travel through a tubular disposed in a borehole, once the composition reaches a particular subterranean location, or some period of time after the composition reaches a particular subterranean location. In some embodiments, the secondary viscosifier can be about 0.000.1 wt % to about 10 wt % of the composition or a mixture including the same, about 0.004 wt % to about 0.01 wt %, or about 0.000.1 wt % or less, 0.000.5 wt %, 0.001, 0.005, 0.01, 0.05, 0.1, 0.5, 1, 2, 3, 4, 5, 6, 7, 8, 9, or about 10 wt % or more of the composition or a mixture including the same.

The secondary viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The secondary viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The secondary viscosifier can include a crosslinked gel or a crosslinkable gel. The secondary viscosifier can include at least one of a linear polysaccharide, and a poly(($C_2$-$C_{10}$)alkene), wherein the ($C_2$-$C_{10}$)alkene is substituted or unsubstituted. The secondary viscosifier can include at least one of poly(acrylic acid) or $(C_1$-$C_5)$alkyl esters thereof, poly(methacrylic acid) or $(C_1$-$C_5)$alkyl esters thereof, poly(vinyl acetate), poly(vinyl alcohol), poly(ethylene glycol), poly(vinyl pyrrolidone), polyacrylamide, poly(hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, karaya gum, cellulose, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the secondary viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The secondary viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted $(C_2-C_{50})$ hydrocarbyl having at least one aliphatic unsaturated C—C bond therein, and a substituted or unsubstituted $(C_2-C_{50})$ alkene. The secondary viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted $(C_1-C_{20})$alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted $(C_1-C_{20})$alkyl ester thereof. The secondary viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted $(C_1-C_{20})$alkenoic substituted or unsubstituted $(C_1-C_{20})$alkanoic anhydride, a substituted or unsubstituted $(C_1-C_{20})$alkenoic substituted or unsubstituted $(C_1-C_{20})$alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—$(C_1-C_{10})$ alkenyl nitrogen containing substituted or unsubstituted $(C_1-C_{10})$heterocycle. The secondary viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly(vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The secondary viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The secondary viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the composition or a mixture including the same can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a $(C_1-C_{30})$hydrocarbylboronic acid, a $(C_1-C_{30})$hydrocarbyl ester of a $(C_1-C_{30})$hydrocarbylboronic acid, a $(C_1-C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a $(C_1-C_{20})$alkylenebiacrylamide (e.g., methylenebisacrylamide), a poly $((C_1-C_{20})$alkenyl)-substituted mono- or poly-$(C_1-C_{20})$alkyl ether (e.g., pentaerythritol allyl ether), and a poly($C_2-C_{20}$) alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000.01 wt % to about 5 wt % of the composition or a mixture including the same, about 0.001 wt % to about 0.01 wt %, or about 0.000.01 wt % or less, or about 0.000.05 wt %, 0.000,1, 0.000,5, 0.001, 0.005, 0.01, 0.05, 0.1, 0.5, 1, 2, 3, 4, or about 5 wt % or more.

In some embodiments, the composition or a mixture including the same can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Xn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Xn^{2+}$, and an $Al^{3+}$ salt of a persulfate, percarbonate, perborate, peroxide, perphosphate, permanganate, chlorite, or hypochlorite ion. An enzymatic breaker can be at least one of an alpha or beta amylase, amyloglucosidase, oligoglucosidase, invertase, maltase, cellulase, hemi-cellulase, and mannanohydrolase. The breaker can be about 0.001 wt % to about 30 wt % of the composition or a mixture including the same, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The composition, or a mixture including the composition, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In some embodiments, the composition, or a mixture including the same, can include any suitable amount of any suitable material used in a downhole fluid. For example, the composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, polyacrylamide, a polymer or combination of polymers, antioxidants, heat stabilizers, foam control agents, solvents, diluents, plasticizer, filler or inorganic particle, pigment, dye, precipitating agent, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. Any suitable proportion of the composition or mixture including the composition can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture.

In various embodiments, the composition or mixture can include a proppant, a resin-coated proppant, an encapsulated resin, or a combination thereof. A proppant is a material that keeps an induced hydraulic fracture at least partially open during or after a fracturing treatment. Proppants can be transported into the subterranean formation (e.g., downhole) to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The composition or mixture can include any suitable amount of proppant, such as about 0.01 wt % to about 99.99 wt %, about 0.1 wt % to about 80 wt %, about 10 wt % to about 60 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

System or Apparatus.

In various embodiments, the present invention provides a system. The system can be any suitable system that can use or that can be generated by use of an embodiment of the composition described herein in a subterranean formation, or that can perform or be generated by performance of a method for using the composition described herein. The system can include a composition including one or more viscosifying non-ionic associative polymers, such as any viscosifying non-ionic associative polymer described herein. The system can also include a subterranean formation including the composition therein. In some embodiments, the composition in the system can also include a downhole fluid, or the system can include a mixture of the composition and downhole fluid. In some embodiments, the system can include a tubular, and a pump configured to pump the composition into the subterranean formation through the tubular.

Various embodiments provide systems and apparatus configured for delivering the composition described herein to a subterranean location and for using the composition therein, such as for a fracturing operation (e.g., pre-pad, pad, slurry, or finishing stages), or for a flooding operation. In various embodiments, the system or apparatus can include a pump fluidly coupled to a tubular (e.g., any suitable type of oilfield pipe, such as pipeline, drill pipe, production tubing, and the like), with the tubular containing a composition including the viscosifying non-ionic associative polymer described herein.

In various embodiments, the present invention provides an apparatus. The apparatus can be any suitable apparatus that can use the composition including the viscosifying non-ionic associative polymer described herein in a subterranean formation, or that can perform or be generated by performance of a method for using the composition including the viscosifying non-ionic associative polymer described herein.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery to the subterranean formation.

FIG. 1 shows an illustrative schematic of systems and apparatuses that can deliver embodiments of the compositions of the present invention to a subterranean location, according to one or more embodiments. It should be noted that while FIG. 1 generally depicts a land-based system or apparatus, it is to be recognized that like systems and apparatuses can be operated in subsea locations as well. Embodiments of the present invention can have a different scale than that depicted in FIG. 1. As depicted in FIG. 1, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 1 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 1, at least part of the composition can, in some embodiments, flow back to wellhead 14 and exit subterranean formation 18. In some embodiments, the composition that has flowed back to wellhead 14 can subsequently be recovered, and in some examples reformulated, and recirculated to subterranean formation 18.

It is also to be recognized that the disclosed composition can also directly or indirectly affect the various downhole or subterranean equipment and tools that can come into contact with the composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 1.

Composition for Treatment of a Subterranean Formation.

Various embodiments provide a composition for treatment of a subterranean formation. The composition can be any suitable composition that can be used to perform an embodiment of the method for treatment of a subterranean formation described herein.

For example, the composition can include the viscosifying non-ionic associative polymer including at least one hydrophilic block and at least one hydrophobic group.

In some embodiments, the composition can be a fracturing fluid for treatment of a subterranean formation, the fracturing fluid including a viscosifying non-ionic associative polymer having the structure:

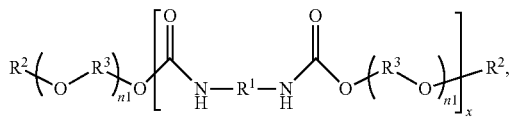

At each occurrence, $R^1$ can be independently substituted or unsubstituted $(C_1-C_{30})$hydrocarbylene interrupted by 0, 1, 2, or 3 groups selected from the group consisting of —O—, —S—, substituted or unsubstituted —NH—, —($CH_2$—$CH_2$—$CH_2$—O$)_{n2}$—, and —($CH_2$—$CH_2$—O$)_{n2}$— wherein at each occurrence n2 can be independently about 1 to about 1,000. At each occurrence, $R^2$ can be an independently selected substituted or unsubstituted $(C_5-C_{50})$hydrocarbyl group. At each occurrence, $R^3$ can be independently selected from propylene and ethylene. At each occurrence, $n^1$ can be independently about 2 to about 10,000. The variable x is about 1 to about 1,000,000. The viscosifying non-ionic associative polymer can be about 0.1 wt % to about 40 wt % of the fracturing fluid composition.

Method for Preparing a Composition for Treatment of a Subterranean Formation.

In various embodiments, the present invention provides a method for preparing a composition for treatment of a subterranean formation. The method can be any suitable method that produces a composition described herein. For example, the method can include forming a composition including the viscosifying non-ionic associative polymer including at least one hydrophilic block and at least one hydrophobic group.

EXAMPLES

Various embodiments of the present invention can be better understood by reference to the following Examples which are offered by way of illustration. The present invention is not limited to the Examples given herein. Concentration of the associative polymer shown in the Figures herein illustrates concentration of the polymer solution (Aculyn™ 44), not the concentration of the associative polymer itself.

General.

An Ares G2 rheometer equipped with a bob and cup geometry was used to record the viscosity.

Example 1. Non-Ionic Associative Polymer

Polymer 1 was provided in a solution, Aculyn™ 44, at 35 wt % in a mixture of 39 wt % propylene glycol and 26 wt % water. Polymer 1 had the structure:

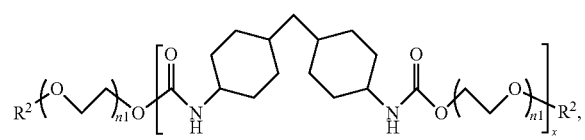

wherein $R^2$ was decyl ($CH_3$—$(CH_2)_9$—) and n1 was about 150.

Example 2. Effect of Shear on Non-Ionic Associative Polymer

Figure 2:
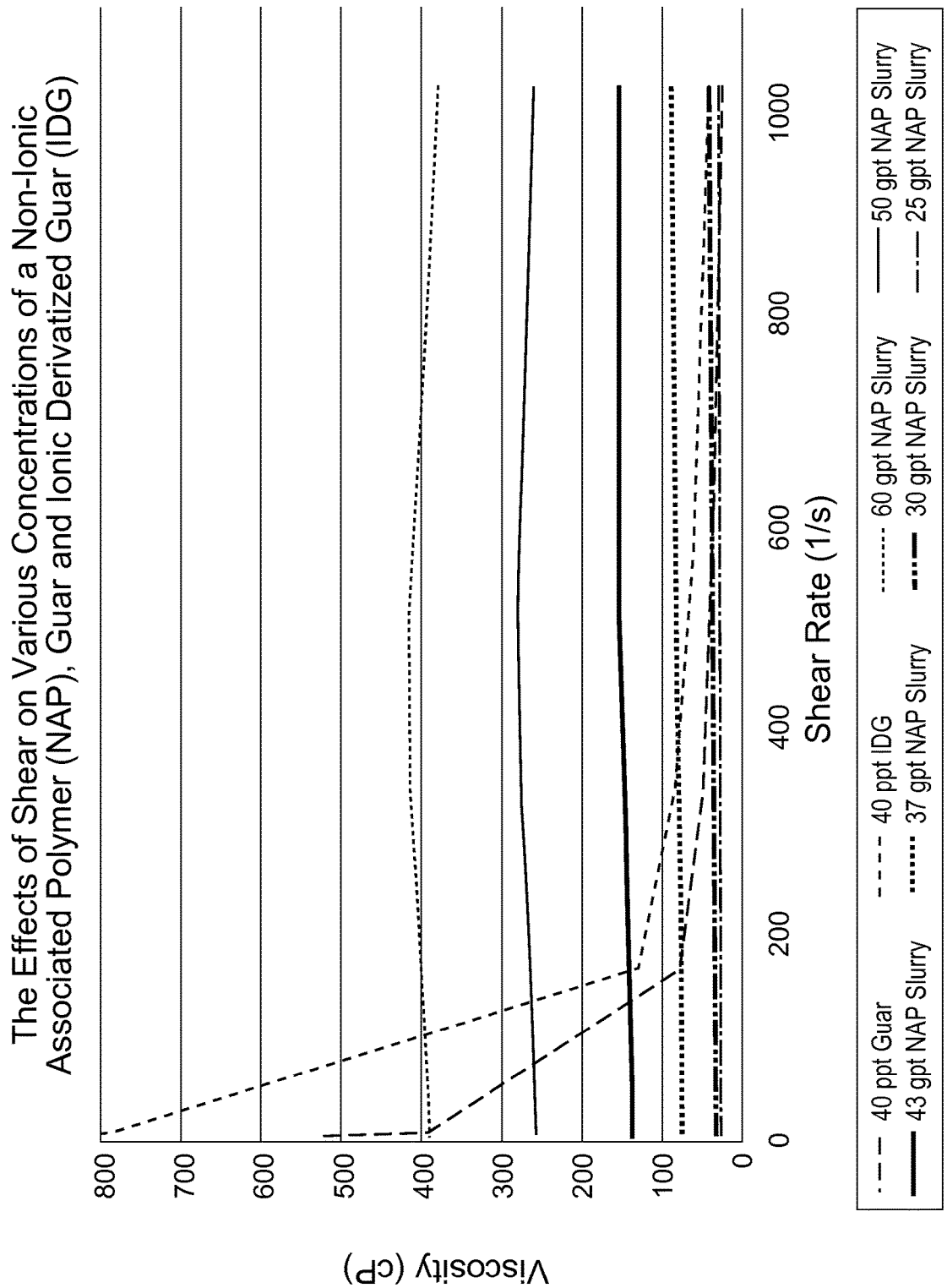
FIG. 2 illustrates viscosity versus shear rate for various polymers at various concentrations, in accordance with various embodiments.

To assess the effects of dissolved salts, pH, and shear on the non-ionic associative polymer of Example 1 and additional polymers commonly used in the oilfield, viscosity was recorded over a wide range of shear rates. FIG. 2 demonstrates the relationship between shear and viscosity for three polymers in an aqueous solution (Polymer 1 of Example 1, non-crosslinked guar, and non-crosslinked ionic derivatized guar (IDG, carboxymethylhydroxypropyl guar having a degree of substitution (DS) between about 0.1 and about 0.3)), wherein ppt is pounds per thousand gallons and gpt is gallons per thousand gallons. This data demonstrates how there is negligible changes in viscosity for the non-ionic associative polymer as the shear rate changes. Common oilfield polymers, like guar and derivatized guar, decrease in viscosity drastically as the shear rate increases. The fluid containing the non-ionic associative polymer held nearly constant viscosity over a wide range of shear rates. Surprisingly, a fluid containing the non-ionic associative polymer which had an approximate viscosity of 70 cP at 10 $s^{-1}$ had roughly double the viscosity of the guar-based fluids at shear rates above 511 $s^{-1}$, even though the guar-based fluids had viscosities between 400 and 800 cP at 10 $s^{-1}$. This indicates that a non-ionic associative polymer could be used to maintain an elevated viscosity under the intense shear experienced in the wellbore without the need to have a highly viscous fluid at the surface. This could potentially be beneficial for high rate water fracs.

Example 3. Effect of Dissolved Salts on Non-Ionic Associative Polymer

Fracturing operations use large amount of water and obtaining fresh water for fracturing operations can be challenging in areas with limited water supply. Use of produced water or flow back water is becoming common in the field to lower consumption of fresh water. The use of this type of water can present many challenges due the high level of dissolved salts they possess. High TDS (total dissolved solids) can greatly hinder hydration of many polymers, especially charged polymers, which are the most common type of polymer class used in water fracs as friction reducing agents.

Figure 3:
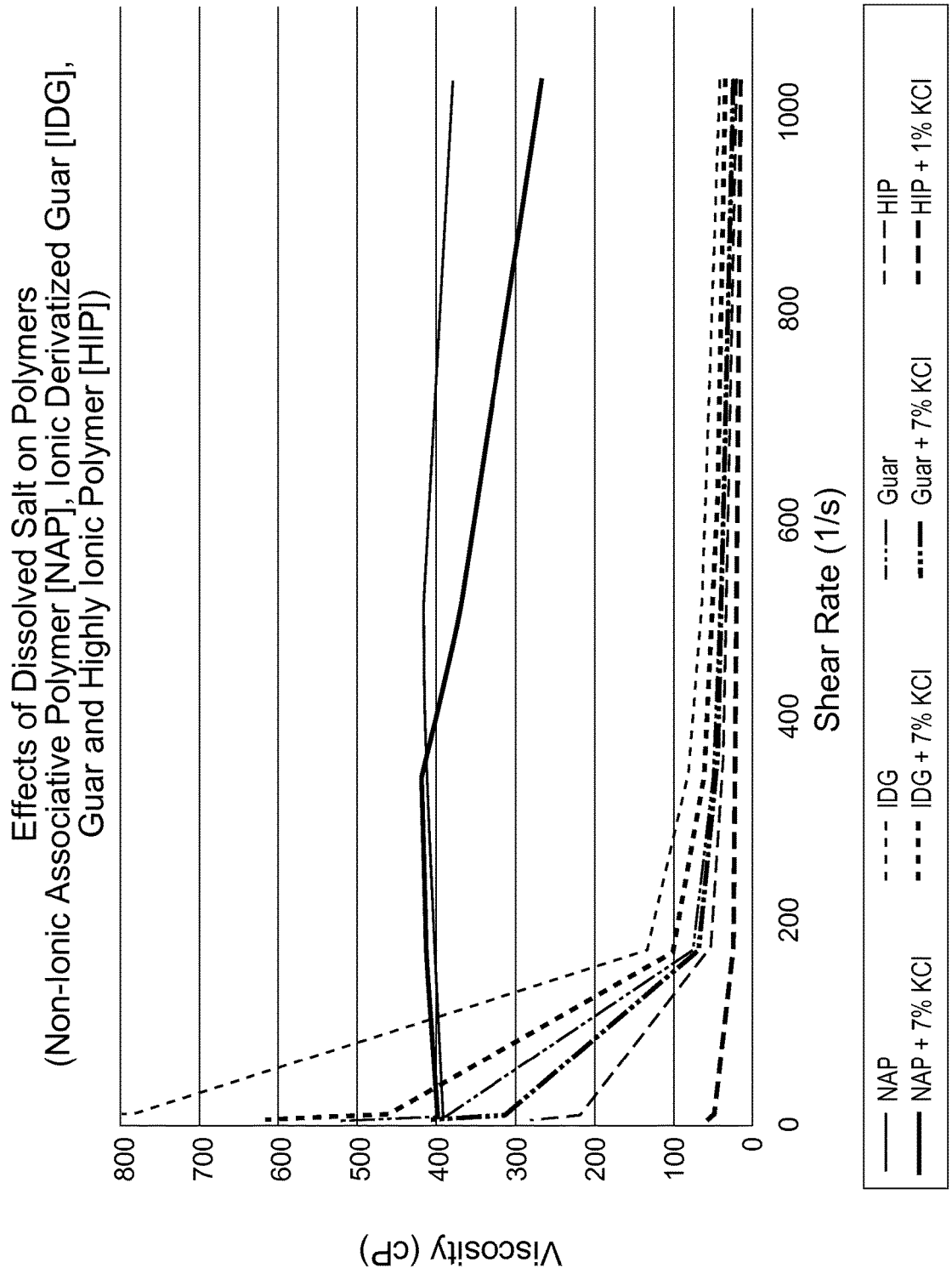
FIG. 3 illustrates viscosity versus shear rate for various polymers and in the presence of various dissolved salts, in accordance with various embodiments.

FIG. 3 illustrates the effect of dissolved salts on four different polymers (Polymer 1 of Example 1, non-crosslinked ionic derivatized guar (IDG, carboxymethylhydroxypropyl guar having a degree of substitution (DS) between about 0.1 and about 0.3), ionic derivatized guar (IDG), and an uncrosslinked highly ionic polymer (HIP, carboxymethylcellulose having a DS of about 0.6 and about 1)). FIG. 3 shows that the non-ionic associative polymer maintains similar viscosity profiles over various salt concentrations without any adjustment to polymer concentration. FIG. 3 shows that as total charge on the polymer increases, so does the sensitivity to dissolved salts.

Example 4. Effect of pH on Non-Ionic Associative Polymer

Figure 4:
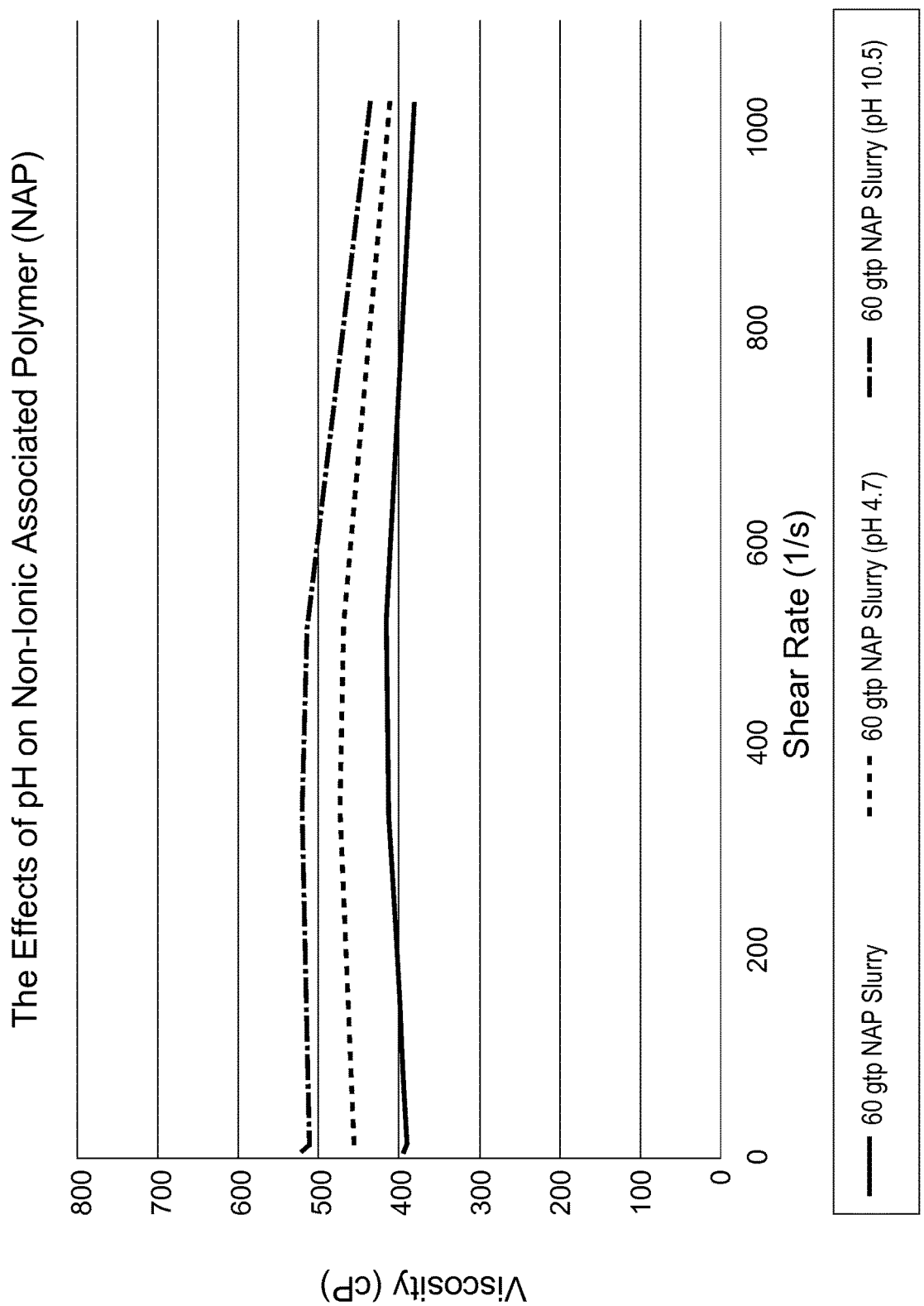
FIG. 4 illustrates viscosity versus shear rate for a nonionic associative polymer under various pH conditions, in accordance with various embodiments.

FIG. 4 illustrates the effect of viscosity on Polymer 1 of Example 1. FIG. 4 demonstrates that the non-ionic associative polymer performance is substantially unaffected by acidic or basic pH.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

ADDITIONAL EMBODIMENTS

The following exemplary embodiments are provided, the numbering of which is not to be construed as designating levels of importance:

Embodiment 1 provides a method of treating a subterranean formation, the method comprising:

placing in the subterranean formation a composition comprising a viscosifying non-ionic associative polymer comprising at least one hydrophilic block and at least one hydrophobic group that is at each occurrence an independently selected substituted or unsubstituted ($C_5$-$C_{50}$)hydrocarbyl group.

Embodiment 2 provides the method of Embodiment 1, wherein the method further comprises obtaining or providing the composition, wherein the obtaining or providing of the composition occurs above-surface.

Embodiment 3 provides the method of any one of Embodiments 1-2, wherein the method further comprises obtaining or providing the composition, wherein the obtaining or providing of the composition occurs in the subterranean formation.

Embodiment 4 provides the method of any one of Embodiments 1-3, wherein the method is a method of hydraulically fracturing the subterranean formation.

Embodiment 5 provides the method of any one of Embodiments 1-4, wherein the composition is a fracturing fluid.

Embodiment 6 provides the method of any one of Embodiments 1-5, further comprising fracturing the subterranean formation with the composition.

Embodiment 7 provides the method of any one of Embodiments 1-6, wherein the composition further comprises a proppant, a resin-coated proppant, or a combination thereof.

Embodiment 8 provides the method of any one of Embodiments 1-7, wherein the method is a method of water flooding, wherein the composition is a water flooding-fluid.

Embodiment 9 provides the method of any one of Embodiments 1-8, further comprising sweeping or displacing oil in the subterranean formation toward a well with the composition.

Embodiment 10 provides the method of any one of Embodiments 1-9, wherein about 0.001 wt % to about 100 wt % of the composition is the viscosifying non-ionic associative polymer.

Embodiment 11 provides the method of any one of Embodiments 1-10, wherein about 0.1 wt % to about 40 wt % of the composition is the viscosifying non-ionic associative polymer.

Embodiment 12 provides the method of any one of Embodiments 1-11, wherein the viscosifying non-ionic associative polymer is effective to provide viscosification of the composition in the absence of surfactants.

Embodiment 13 provides the method of any one of Embodiments 1-12, wherein the composition is substantially free of surfactants.

Embodiment 14 provides the method of any one of Embodiments 1-13, wherein the viscosifying non-ionic associative polymer comprises at least two of the hydrophobic groups.

Embodiment 15 provides the method of any one of Embodiments 1-14, wherein the viscosifying non-ionic associative polymer is a linear polymer having two of the hydrophobic groups, wherein the hydrophobic groups are terminal hydrophobic groups.

Embodiment 16 provides the method of any one of Embodiments 1-15, wherein the viscosifying non-ionic associative polymer is at least one of a graft polymer and a star polymer.

Embodiment 17 provides the method of any one of Embodiments 1-16, wherein at each occurrence the hydrophobic group is an independently selected ($C_8$-$C_{30}$)hydrocarbyl group.

Embodiment 18 provides the method of any one of Embodiments 1-17, wherein at each occurrence the hydrophilic block has a structure selected from the group consisting of —(CH$_2$—CH$_2$—CH$_2$—O)$_{n1}$— and —(CH$_2$—CH$_2$—O)$_{n1}$—, wherein at each occurrence n1 is independently about 1 to about 10,000.

Embodiment 19 provides the method of any one of Embodiments 1-18, wherein the viscosifying non-ionic associative polymer comprises an amine-containing linking group between each hydrophilic block.

Embodiment 20 provides the method of Embodiment 19, wherein the viscosifying non-ionic associative polymer has the structure:

wherein
EG is the hydrophobic group,
HPB is the hydrophilic block,
LG is the amine-containing linking group, and
x is about 1 to about 1,000,000.

Embodiment 21 provides the method of any one of Embodiments 19-20, wherein the amine-containing linking group is derived from at least one of a diisocyanate, melamine, urea, thiourea, cyanamide, and a diamine.

Embodiment 22 provides the method of any one of Embodiments 19-21, wherein the amine-containing linking group is a diurethane having the structure:

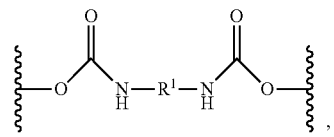

wherein at each occurrence, $R^1$ is independently substituted or unsubstituted ($C_1$-$C_{30}$)hydrocarbylene interrupted by 0, 1, 2, or 3 groups selected from the group consisting of —O—, —S—, substituted or unsubstituted —NH—, —(CH$_2$—CH$_2$—CH$_2$—O)$_{n2}$—, and —(CH$_2$—CH$_2$—O)$_{n2}$— wherein at each occurrence n2 is independently about 1 to about 1,000.

Embodiment 23 provides the method of any one of Embodiments 1-22, wherein the viscosifying non-ionic associative polymer has the structure:

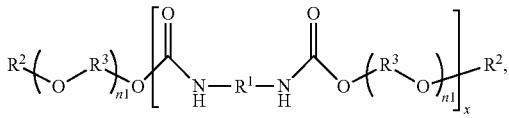

wherein at each occurrence, $R^1$ is independently substituted or unsubstituted $(C_1-C_{30})$hydrocarbylene interrupted by 0, 1, 2, or 3 groups selected from the group consisting of —O—, —S—, substituted or unsubstituted —NH—, —(CH$_2$—CH$_2$—CH$_2$—O)$_{n2}$—, and —(CH$_2$—CH$_2$—O)$_{n2}$— wherein at each occurrence n2 is independently about 1 to about 1,000 at each occurrence, $R^2$ is an independently selected substituted or unsubstituted $(C_5-C_{50})$hydrocarbyl group;

at each occurrence, $R^3$ is independently selected from propylene and ethylene;

at each occurrence, $n^1$ is independently about 1 to about 10,000 x is about 1 to about 1,000,000.

Embodiment 24 provides the method of Embodiment 23, wherein at each occurrence, $R^1$ is independently a $(C_1-C_{30})$hydrocarbylene.

Embodiment 25 provides the method of any one of Embodiments 23-24, wherein at each occurrence, $R^1$ has a structure selected from the group consisting of:

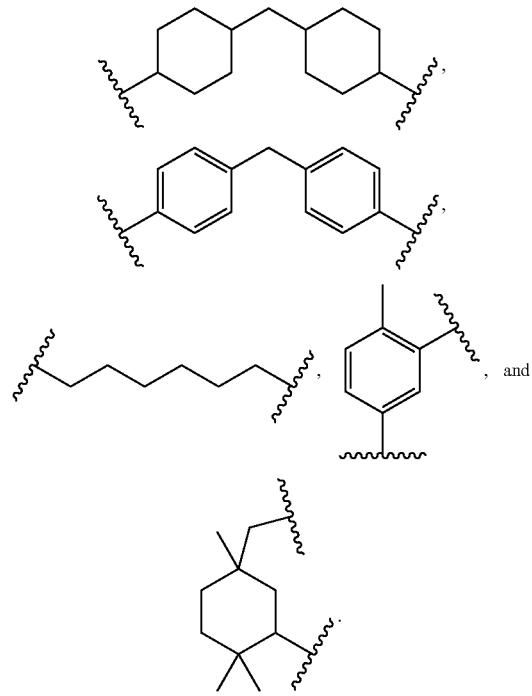

Embodiment 26 provides the method of any one of Embodiments 23-25, wherein $R^1$ has a structure:

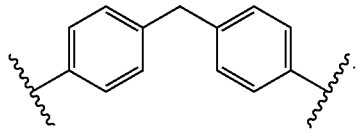 [SMILES: *c1ccc(Cc2ccc(*)cc2)cc1]

Embodiment 27 provides the method of any one of Embodiments 23-26, wherein at each occurrence, $R^2$ is an independently selected $(C_8-C_{30})$hydrocarbyl group.

Embodiment 28 provides the method of any one of Embodiments 23-27, wherein at each occurrence, $R^2$ is an independently selected $(C_8-C_{20})$hydrocarbyl group.

Embodiment 29 provides the method of any one of Embodiments 23-28, wherein $R^3$ is ethylene.

Embodiment 30 provides the method of any one of Embodiments 23-29, wherein at each occurrence, $n^1$ is independently about 2 to about 1,000.

Embodiment 31 provides the method of any one of Embodiments 23-30, wherein at each occurrence, $n^1$ is independently about 50 to about 200.

Embodiment 32 provides the method of any one of Embodiments 23-31, wherein x is about 2 to about 1,000,000.

Embodiment 33 provides the method of any one of Embodiments 23-32, wherein x is about 2 to about 10,000.

Embodiment 34 provides the method of any one of Embodiments 23-33, wherein the viscosifying non-ionic associative polymer has the structure:

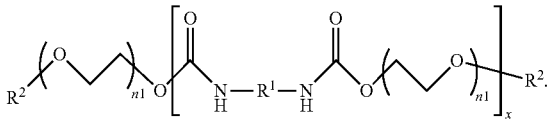

Embodiment 35 provides the method of any one of Embodiments 23-34, wherein the viscosifying non-ionic associative polymer has the structure:

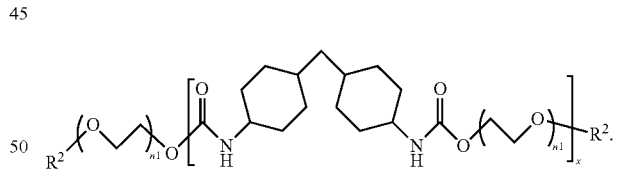

Embodiment 36 provides the method of any one of Embodiments 1-35, wherein the viscosifying non-ionic associative polymer has a molecular weight of about 500 to about 10,000,000.

Embodiment 37 provides the method of any one of Embodiments 1-36, wherein the viscosifying non-ionic associative polymer has a molecular weight of about 1,000 to about 100,000.

Embodiment 38 provides the method of any one of Embodiments 1-37, wherein the composition further comprises a secondary viscosifier.

Embodiment 39 provides the method of any one of Embodiments 1-38, wherein the composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, polyacrylamide, polymer or combination of polymers, antioxidant, heat stabilizer, foam control agent, solvent, diluent, plasticizer, filler or inorganic particle, pigment, dye, precipitating agent, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 40 provides the method of any one of Embodiments 1-39, wherein the placing of the composition in the subterranean formation comprises pumping the composition through a tubular disposed in a wellbore and into the subterranean formation.

Embodiment 41 provides a system for performing the method of any one of Embodiments 1-40, the system comprising:
a tubular disposed in the subterranean formation; and
a pump configured to pump the composition in the subterranean formation through the tubular.

Embodiment 42 provides a method of treating a subterranean formation, the method comprising:
placing in the subterranean formation a fracturing fluid composition comprising a viscosifying non-ionic associative polymer having the structure:

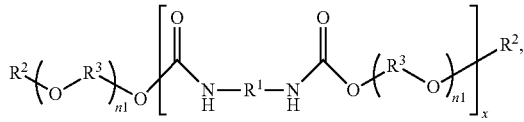

wherein
at each occurrence, $R^1$ is independently substituted or unsubstituted $(C_1\text{-}C_{30})$hydrocarbylene interrupted by 0, 1, 2, or 3 groups selected from the group consisting of —O—, —S—, substituted or unsubstituted —NH—, —(CH$_2$—CH$_2$—CH$_2$—O)$_{n2}$—, and —(CH$_2$—CH$_2$—O)$_{n2}$— wherein at each occurrence n2 is independently about 1 to about 1,000,
at each occurrence, $R^2$ is an independently selected substituted or unsubstituted $(C_5\text{-}C_{50})$hydrocarbyl group,
at each occurrence, $R^3$ is independently selected from propylene and ethylene,
at each occurrence, $n^1$ is independently about 2 to about 10,000,
x is about 1 to about 1,000,000, and
the viscosifying non-ionic associative polymer is about 0.1 wt % to about 40 wt % of the fracturing fluid composition; and
fracturing the subterranean formation with the fracturing fluid composition.

Embodiment 43 provides a system comprising:
a tubular disposed in a subterranean formation; and
a pump configured to pump a composition comprising a viscosifying non-ionic associative polymer in the subterranean formation through the tubular, the viscosifying non-ionic associative polymer comprising at least one hydrophilic block and at least one hydrophobic group that is at each occurrence an independently selected substituted or unsubstituted $(C_5\text{-}C_{50})$hydrocarbyl group.

Embodiment 44 provides a composition for treatment of a subterranean formation, the composition comprising:
a viscosifying non-ionic associative polymer comprising at least one hydrophilic block and at least one hydrophobic group that is at each occurrence an independently selected substituted or unsubstituted $(C_5\text{-}C_{50})$hydrocarbyl group.

Embodiment 45 provides the composition of Embodiment 44, wherein the composition is a fracturing fluid.

Embodiment 46 provides a fracturing fluid for treatment of a subterranean formation, the fracturing fluid comprising:
a viscosifying non-ionic associative polymer having the structure:

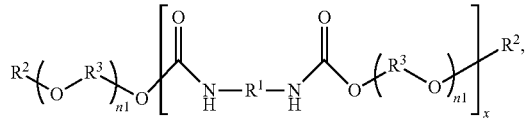

wherein
at each occurrence, $R^1$ is independently substituted or unsubstituted $(C_1\text{-}C_{30})$hydrocarbylene interrupted by 0, 1, 2, or 3 groups selected from the group consisting of —O—, —S—, substituted or unsubstituted —NH—, —(CH$_2$—CH$_2$—CH$_2$—O)$_{n2}$—, and —(CH$_2$—CH$_2$—O)$_{n2}$— wherein at each occurrence n2 is independently about 1 to about 1,000,
at each occurrence, $R^2$ is an independently selected substituted or unsubstituted $(C_5\text{-}C_{50})$hydrocarbyl group,
at each occurrence, $R^3$ is independently selected from propylene and ethylene,
at each occurrence, $n^1$ is independently about 2 to about 10,000,
x is about 1 to about 1,000,000, and
the viscosifying non-ionic associative polymer is about 0.1 wt % to about 40 wt % of the fracturing fluid composition.

Embodiment 47 provides a method of preparing a composition for treatment of a subterranean formation, the method comprising:
forming the composition comprising a viscosifying non-ionic associative polymer comprising at least one hydrophilic block and at least one hydrophobic group that is at each occurrence an independently selected substituted or unsubstituted $(C_5\text{-}C_{50})$hydrocarbyl group.

Embodiment 48 provides the method, system, or composition of any one or any combination of Embodiments 1-47 optionally configured such that all elements or options recited are available to use or select from.

What is claimed is:
1. A method of treating a subterranean formation, comprising:
placing a composition into the subterranean formation, wherein the composition comprises a viscosifying non-ionic associative polymer comprising at least one hydrophilic block and at least one hydrophobic group that is at each occurrence an independently selected substituted or unsubstituted $(C_5\text{-}C_{50})$hydrocarbyl group, wherein the viscosifying non-ionic associative polymer comprises an amine-containing linking group between each hydrophilic block.

2. The method of claim 1, further comprising fracturing the subterranean formation with the composition, and wherein the composition further comprises a proppant.

3. The method of claim 1, wherein about 0.1 wt % to about 40 wt % of the composition is the viscosifying non-ionic associative polymer.

4. The method of claim 1, wherein the viscosifying non-ionic associative polymer is a linear polymer having two of the hydrophobic groups, and wherein the hydrophobic groups are terminal hydrophobic groups.

5. The method of claim 1, wherein the viscosifying non-ionic associative polymer is at least one of a graft polymer, a star polymer, or a combination thereof.

6. The method of claim 1, wherein at each occurrence the hydrophobic group is an independently selected ($C_8$-$C_{30}$) hydrocarbyl group, and wherein the viscosifying non-ionic associative polymer has a molecular weight of about 1,000 to about 100,000.

7. The method of claim 1, wherein at each occurrence the hydrophilic block has a structure selected from the group consisting of —($CH_2$—$CH_2$—$CH_2$—O)$_{n1}$— and —($CH_2$—$CH_2$—O)$_{n1}$—, and wherein at each occurrence n1 is independently 1 to about 10,000.

8. The method of claim 1, wherein the viscosifying non-ionic associative polymer has the structure:

$$EG—HPB—[LG—HPB]_x—EG,$$

wherein:
EG is the hydrophobic group;
HPB is the hydrophilic block;
LG is the amine-containing linking group; and
x is 1 to about 1,000,000.

9. The method of claim 8, wherein the amine-containing linking group is derived from at least one of diisocyanate, melamine, urea, thiourea, cyanamide, diamine, or any combination thereof.

10. The method of claim 9, wherein the amine-containing linking group is a diurethane having the structure:

wherein at each occurrence, $R^1$ is independently substituted or unsubstituted ($C_1$-$C_{30}$)hydrocarbylene interrupted by 0, 1, 2, or 3 groups selected from the group consisting of —O—, —S—, substituted or unsubstituted —NH—, —($CH_2$—$CH_2$—$CH_2$—O)$_{n2}$—, and —($CH_2$—$CH_2$—O)$_{n2}$—, wherein at each occurrence n2 is independently 1 to about 1,000.

11. The method of claim 10, wherein the viscosifying non-ionic associative polymer has the structure:

wherein:
at each occurrence, $R^1$ is independently substituted or unsubstituted ($C_1$-$C_{30}$)hydrocarbylene interrupted by 0, 1, 2, or 3 groups selected from the group consisting of —O—, —S—, substituted or unsubstituted —NH—, —($CH_2$—$CH_2$—$CH_2$—O)$_{n2}$—, and —($CH_2$—$CH_2$—O)$_{n2}$— wherein at each occurrence n2 is independently 1 to about 1,000;

at each occurrence, $R^2$ is an independently selected substituted or unsubstituted ($C_5$-$C_{50}$)hydrocarbyl group;

at each occurrence, $R^3$ is independently selected from propylene and ethylene;

at each occurrence, $n^1$ is independently 1 to about 10,000; and x is 1 to about 1,000,000.

12. The method of claim 11, wherein at each occurrence, $R^1$ has a structure selected from the group consisting of:

13. The method of claim 11, wherein $R^1$ has a structure:

14. The method of claim 11, wherein:
at each occurrence, $R^2$ is an independently selected $(C_8$-$C_{20})$hydrocarbyl group;
$R^3$ is ethylene;
at each occurrence, $n^1$ is independently about 50 to about 200; and
x is 2 to about 10,000.

15. The method of claim 11, wherein the viscosifying non-ionic associative polymer has the structure:

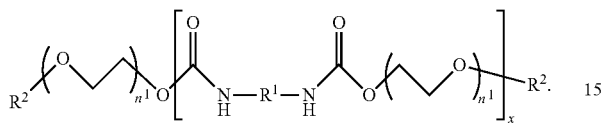

16. The method of claim 11, wherein the viscosifying non-ionic associative polymer has the structure:

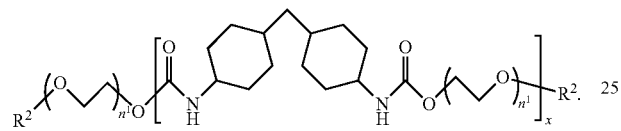

17. A method of treating a subterranean formation, comprising:
placing a fracturing fluid composition into the subterranean formation, wherein the fracturing fluid composition comprises a viscosifying non-ionic associative polymer having the structure:

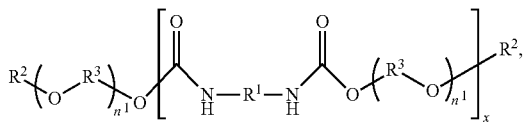

wherein:
at each occurrence, $R^1$ is independently substituted or unsubstituted $(C_1$-$C_{30})$hydrocarbylene interrupted by 0, 1, 2, or 3 groups selected from the group consisting of —O—, —S—, substituted or unsubstituted —NH—, —(CH$_2$—CH$_2$—CH$_2$—O)$_{n2}$—, and —(CH$_2$—CH$_2$—O)$_{n2}$— wherein at each occurrence n2 is independently 1 to about 1,000;
at each occurrence, $R^2$ is an independently selected substituted or unsubstituted $(C_5$-$C_{50})$hydrocarbyl group;
at each occurrence, $R^3$ is independently selected from propylene and ethylene;
at each occurrence, $n^1$ is independently 2 to about 10,000;
x is 1 to about 1,000,000; and
the viscosifying non-ionic associative polymer is about 0.1 wt % to about 40 wt % of the fracturing fluid composition; and
fracturing the subterranean formation with the fracturing fluid composition.

* * * * *